United States Patent

Egan et al.

[15] 3,683,114

[45] Aug. 8, 1972

[54] AUTOMATIC DIALING AND MESSAGE REPORTING SYSTEM

[72] Inventors: Edward J. Egan, 243 E. Knight St., Collingswood, N.J. 08108; Joseph P. Gallagher, 21 Navajo Rd., Ni Nella, N.J.

[22] Filed: July 22, 1968

[21] Appl. No.: 746,625

[52] U.S. Cl. ....................179/5

[51] Int. Cl. ....................H04m 1/46, H04m 11/04

[58] Field of Search ....................179/5 R, 2 R, 2 RC

[56] References Cited

UNITED STATES PATENTS

| | | | |
|---|---|---|---|
| 3,128,349 | 4/1964 | Boesch et al. | 179/84 |
| 3,158,864 | 11/1964 | Lehan | 343/205 |
| 3,207,850 | 9/1965 | Foreman | 179/5 |
| 3,461,241 | 8/1969 | Menke | 179/5 |

FOREIGN PATENTS OR APPLICATIONS

| | | | |
|---|---|---|---|
| 1,135,173 | 12/1968 | Great Britain | 179/5 |

*Primary Examiner*—Kathleen H. Claffy
*Assistant Examiner*—Douglas W. Olms
*Attorney*—Edward M. Farrell

[57] ABSTRACT

A condition responsive system includes means responsive to an abnormal condition to cause automatic transmission to a selected station over a telephone line a message relating to the abnormal condition.

9 Claims, 3 Drawing Figures

INVENTORS
EDWARD J. EGAN
JOSEPH P. GALLAGHER
BY Edward M Farrell
ATTORNEY

INVENTORS
EDWARD J. EGAN
BY JOSEPH P. GALLAGHER
Edward M. Farrell
ATTORNEY

AUTOMATIC DIALING AND MESSAGE REPORTING SYSTEM

Fire and burglar alarm systems which are responsive to fires and burglars to transmit warning signals to remote points are well known. Such systems have been used by telephone subscribers in connection with conventional telephone lines.

Systems have also been employed wherein transducers are used to detect abnormal conditions and then automatically actuate transmitters to cause information relating to such abnormal conditions to be transmitted to a remote station. Other systems have included means for automatically selecting one of a plurality of stations and then transmitting a message thereto.

In general, many of the alarm systems used heretofore have been designed for specific purposes and normally not adapted for use in other types of systems. Also, many of the systems used heretofore have been relatively complex, expensive or otherwise have included characteristics making them impractical for use by the average homeowner.

It is an object of this invention to provide an improved system for automatically selecting a remote station and transmitting a message thereto.

It is a further object of this invention to provide an improved system responsive to an abnormal condition for automatically transmitting information relative to said condition to a remote station.

It is still a further object of this invention to provide an improved alarm system in which a warning signal may be automatically transmitted to a remote station.

It is still a further object of this invention to provide an improved warning system wherein the response to spurious signals is minimized.

It is still a further object of this invention to provide an improved system for dialing a subscriber and then transmitting a message of relatively high fidelity.

It is still a further object of this invention to provide an improved condition responsive system wherein automatic dialing and message transmission is achieved relatively simply and with a minimum number of parts.

It is still a further object of this invention to provide an improved system for automatic dialing and transmission of a message wherein the system will continue to be operative in the event of failure of the house current normally operating the system.

In accordance with the present invention, a system for responding to an abnormal condition and for selectively calling a remote station and transmitting a message through telephone lines is provided. Storage means, which may be a tape recorder, includes signals relating to the address or number of the station to be called as well as the message to be transmitted. A first circuit is responsive to the abnormal condition detected to cause the address signals to be applied to the telephone lines for dialing the remote station. Means are provided to "hold the lines" after it has been dialed. A message is then applied from the storage means to the telephone lines through a different circuit path than the dialed signals. Recycling means may be included to permit dialing and message transmissions to take place continuously or at predetermined intervals in the event of the failure of the subscriber to answer at the remote station.

Other objects and advantages of the present invention will be apparent and suggest themselves to those skilled in the art from a reading of the following specification and claims, in conjunction with the accompanying drawings, in which:

Figure 1:
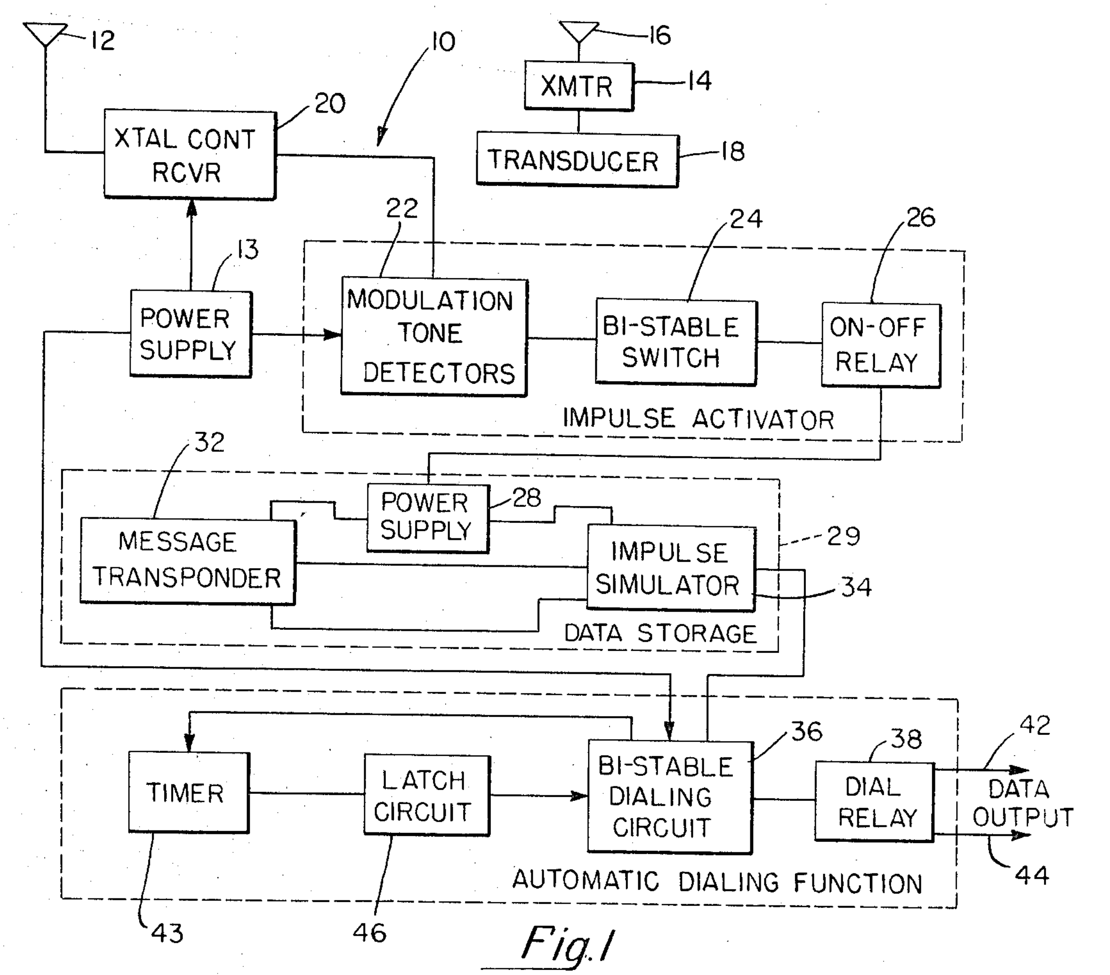
FIG. 1 is a block diagram of a condition responsive system, in accordance with the present invention.

Referring particularly to FIG. 1, one system embodying the present invention includes a base unit station 10 which includes an antenna 12 for receiving signals generated by a transmitter 14 through an antenna 16. The transmitter 14 may be responsive to a condition sensed by a transducer 18. The condition sensed may be any type of abnormal condition, such as fire, for example. The operational distance between the base unit and the transmitting station is limited only by the frequency of the carrier signal selected and the output power of the transmitter. A typical system may have the transmitting station within a mile of the base unit. A power supply 13 provides operating voltages for the base unit.

The receiver 20 is highly selective to reject all signals other than that to which it is tuned. In order to minimize the possibility of the system being activated by spurious signals, the transmitter 14 transmits a precise r.f. carrier signal which is modulated by at least two stable key frequencies. Consequently, if the two modulation signals are not detected in the received signal, the system remains non-responsive.

The output signal from the receiver 20 is applied to modulation tone detectors 22, which detect the two modulated signals included in the carrier signal. The detectors may include resonant reed relays of the conventional types or other suitable detector circuits. In order to minimize the liklihood of spurious signals activating the system, the system may be designed so that both modulation frequencies must be present for a predetermined minimum time, for example, three seconds.

When the two modulation signals are both present for a predetermined time, an output signal is applied to a bi-stable switching circuit 24. This bi-stable circuit may be one of a number of different kinds, for example, a Schmitt Trigger circuit, which will normally operate in one stable state and is adapted to be switched to a second or opposite state upon the application of a signal thereto. Such a circuit, once switched, generally will maintain its switched operating condition after the input signal has been removed.

The bi-stable circuit 24 actuates an "off-on" relay 26. When the relay 26 is switched on, a power supply circuit 28 is activated to start a number of operations in a storage device 29, which may include a tape recorder having a recorded address of a remote station to be dialed and a message to be transmitted.

Upon actuation of the power supply 28, a message transponder 32, which may include the tape with information recorded thereon, actuates an impulse simulator circuit 34. The circuit 34 provides impulse signals for dialing the address signal of the remote station to which the subsequent message is to be sent.

The impulse signals are applied to a bi-stable dialing circuit 36. The impulse signals are applied from the dialing circuit 36 through a dial relay 38 to a pair of lines 42 and 44, which may be a pair of conventional telephone lines.

The bi-stable dialing circuit 36 produces output signals which are applied to a timing circuit 43. The purpose of this circuit is to allow a time lapse to permit completion of the dialing prior to the transmission of the message. A signal following the dial signals may be used to assure the operation of a timer circuit, which holds the line closed. Upon completion of a predetermined time, an output signal from the timer circuit 43 is applied to a latch circuit 46. The signal from the latch circuit 46 is applied to the bi-stable dialing circuit 36 and is used to "hold the line" closed after the dialing has been completed. The timer circuit to hold the line closed is required because in most systems involving the use of conventional telephone lines the receiver will not be lifted off the hook and the signal produced by the timer circuit which is connected to the telephone lines will create a circuit condition equivalent to that when the receiver is off the hook.

Figure 2:
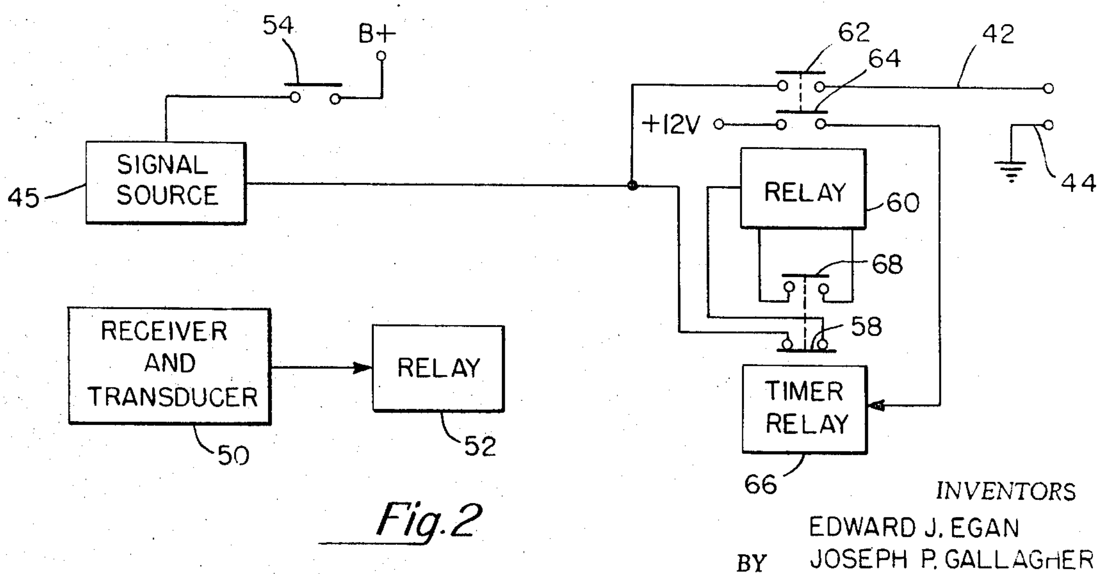
FIG. 2 is a simplified diagram, partly in block diagram form illustrating the present invention.

Referring particularly to FIG. 2, a simplified version of one of the main parts of the system involving the present invention is illustrated. A signal source 45 may be a tape recorder adapted to transmit dialing signals and a message to telephone lines 42 and 44 upon detection of an abnormal condition by the transducer or receiver 50, which would also include demodulation circuits. In the absense of an abnormal condition, no signals will be applied to the lines 42 and 44.

When an abnormal condition is detected, an output signal from the transducer or receiver 50 actuates a relay 52 which causes contact arms 54 to close. The closing of the contact arm 54 causes operating potential, designated B plus to be applied through the contact arm 54 to actuate the signal source 45. The dialing signals are then applied through a normally closed contact arm 58 to actuate a relay 60. Because the dialing signals are in the form of pulses, the relay 60 will open and close to open and close contact arms 62 and 64. The contact arm 62 opens and closes the telephone lines 42 and 44 in accordance with the recorded pulse signals at the signal source 45.

A voltage, represented by plus 12 v. is applied to a timer relay 66 through the contact arm 64. The timer may include an integrator circuit for building up an electrical charge. At the expiration of a predetermined time, the timer relay becomes actuated to open the contact arm 58 and close the contact arm 68.

Closing of the contact arm 68 keeps the relay 60 closed, which in turn maintains the contact arms 62 and 64 closed. At the same time, the contact arm 58 is opened. Following the dialing signals, an additional signal may be used to assure that the line is held. The system has now completed the transmission of the dialing signals and the line is being held and ready to transmit and message related to the abnormal condition detected.

The recorded signals from the signal source 45 are applied to the telephone lines 42 and 45 through the closed contact arm 62. It is noted that this latter signal path for message transmission is different than the signal path for dialing signals transmission. The open contact arm 58 prevents the signals from the signal source from passing through the dialing path. This arrangement results in higher fidelity of the transmitted message which is not associated with relays and interference by circuitry normally connected to the dialing circuitry.

Figure 3:
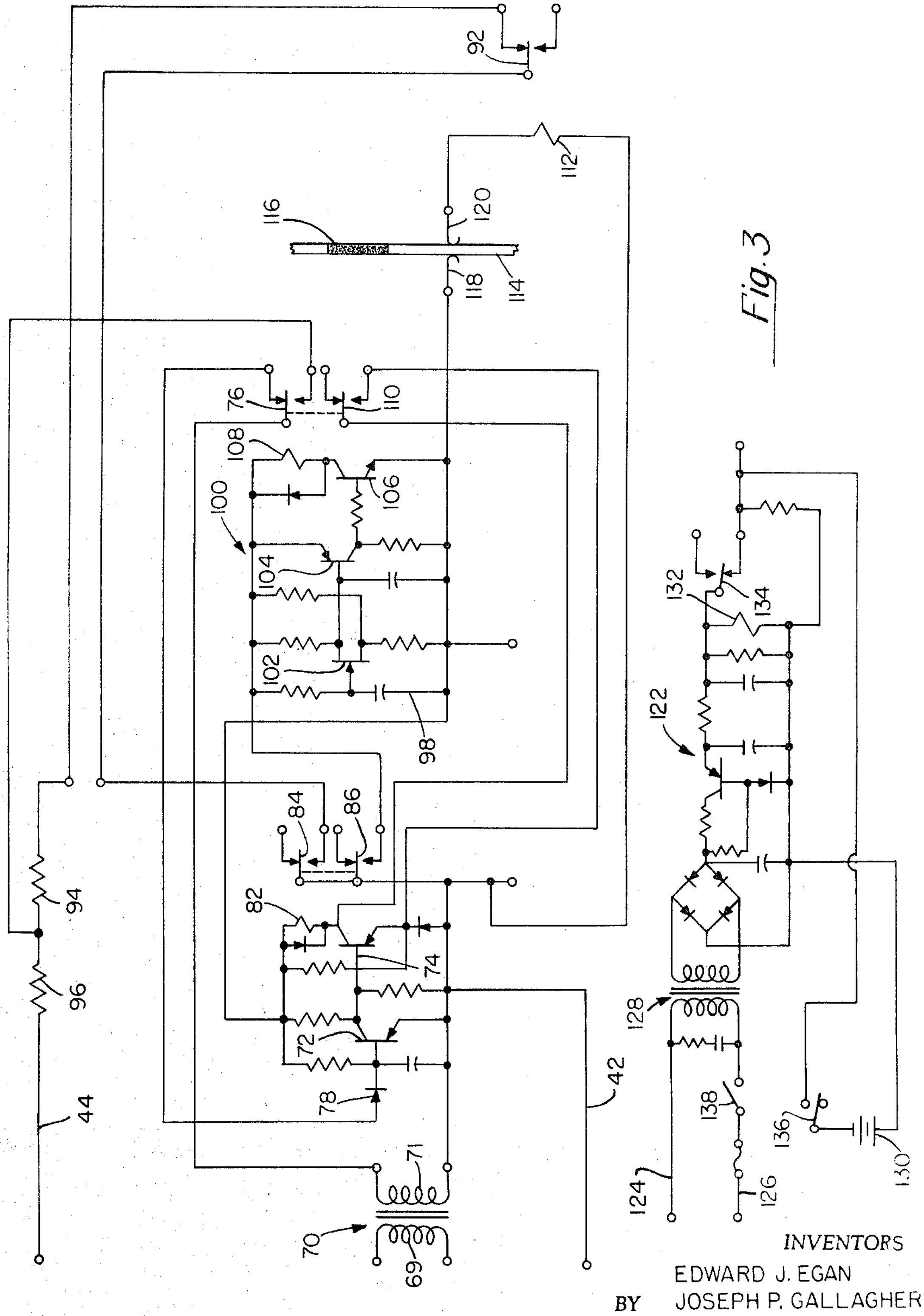
FIG. 3 is detailed schematic diagram of a system, in accordance with the present invention.

Referring particularly to FIG. 3, a complete schematic diagram including the features outlined in FIG. 2 and details of other features involved in the present invention are illustrated. Input signals from the tape recorder or other storage means are applied through a transformer 70, which includes a primary winding 69 and a secondary winding 71 to a bi-stable circuit. The bi-stable circuit includes a pair of transistors 72 and 74. The signal from the secondary winding 71 is connected through a normally closed contact arm 76, through a diode 78 to the base of the transistor 72.

The transistor 72 is normally in a conducting saturated state with the transistor 74 being normally non-conducting or cut off. The collector circuit of the transistor 74 includes a relay 82 which is inoperative when the transistor 74 is non-conducting.

Upon the application of a dialing pulse to the base of the transistor 72, the transistor 72 is switched to a non-conducting state. This causes the voltage at the collector of the transistor 72 and at the base of the transistor 74 to rise causing the transistor 74 to be switched to a conducting state. When the transistor 74 becomes conducting, the relay 82 becomes operative to close the contact arms 84 and 86.

Closing of the contact arm 84 connects the line 42, to the other telephone line 44 through the contact arm 84, contact arm 92 of a recycling relay, and a pair of resistors 94 and 96. The purpose of the recycling relay will be described hereinafter. The contact arm 84 opens and closes in accordance with the pulse signals so that the number dialed is applied to the telephone lines, in much the same manner as found in conventional telephone systems.

When the relay 82 is actuated, the contact arm 86 closes to connect a source of power, designated as plus 12 v., to a charging circuit including a capacitor 98, which forms part of a timer circuit 100.

The timing circuit 100 includes a field effect transistor 102 followed by another bi-stable circuit including transistors 104 and 106. The transistor 104 is normally conducting and the transistor 106 is normally non-conducting. The transistor 102 is normally non-conducting with its output signal maintaining the transistor 104 conducting.

When the voltage across the capacitor 98 reaches a predetermined level dependent upon the time requirements of the system, the transistor 102 becomes conducting. The output voltage from the transistor 102 drops causing the transistor 104 to become conducting. When the transistor 104 becomes conducting, its output voltage drops driving transistor 106 to a conducting state.

When the transistor 106 becomes conductive, a relay 108 connected in its collector circuit, is actuated to move contact arms 76 and 110 to different contact positions.

When the relay 108 is actuated, the contact arm 110 is connected across the collector-emitter circuit of the transistor 74 providing substantially a short circuit. This results in the transistor 74 remaining in its conductive state regardless of the absence of any input dialing signals. With the transistor 74 in a conducting state, the relay 82 remains activated to keep the contact arms 84 and 86 closed.

Maintaining the contact arm 86 continuously closed results in holding the circuit closed between the lines 42 and 44. The actuation of the contact arm 76 results in opening the circuit between the second-winding 71 and the input circuit of the transistor 72. Actuation of the contact arm 76 also results in connecting the secondary winding 71 directly to the line 44 through resistor 96.

It is therefore seen that the output signals from the transformer 70 may be applied to one of two different circuit paths. The first path is through the bi-stable circuit including the transistors 72 and 74. This is the path used for the transmission of the dialing signals. The second path is from the transformer directly to the telephone lines and omits the path through the transistors 72 and 74, along with the associated relay, contacts and other elements. This second path is used for the transmission of the message which may include information relative to the abnormal condition detected, for example.

The use of a separate path for the transmission of the message results in a transmission of relatively high fidelity. If the dialing path were used for the transmitted message, the message would be subject to noise and other interference tending to detract from the fidelity of the transmitted message.

A feature of the present invention involves recycling of the dialing and transmission of the message. For example, if a station is called and there is no answer by the subscriber, the message may be sent for a predetermined time and then discontinued. The call can then be made at a later time and at predetermined time intervals. Various means for recycling may be employed.

A relay 112 is associated with the contact arm 92 which is normally closed to permit the dialing signals to pass therethrough as previously described. A tape 114, which may be the tape on which the dialing and address signals are stored, is moved between a pair of contacts 118 and 120. Because the main portion of the tape is non-conductive, the circuit path between sources of power designated plus 12 v. and minus 12 v. will normally be open and the relay 112 is not actuated.

The tape includes a conductive portion 116, which may be disposed towards the end of the message to be transmitted. When the portion 116, which may be a thin metallic film on tape, passes between the contacts 118 and 120, a circuit is closed to activate the relay 112 which opens the contact arm 92. Opening of the contact arm 92 breaks the circuit and no signal is applied to the lines 42 and 44. This action resets the circuits in the system to their original states.

A power supply 112 of a conventional type may be employed to supply the required operating voltages for the system. Voltages may be supplied from a 110 v. a. c. source including lines 124 and 126 to a power transformer 128. An emergency battery 130 is provided. In the event of failure of the normal voltage at the lines 124 and 126, the battery provides the necessary operating voltages for the system.

A relay 132 is provided in the output circuit of the power supply. As long as an output voltage is generated by the power supply, the relay 132 will be operative to actuate the contact arms 134 and 136 downward. In the absense of normal power, the contact arms 134 and 136 will be up. Under the latter conditions, the normal power supply 122 is disconnected and the battery 130 provides the power to operate the system.

The system described is designed to initiate a coded signal which may be used to notify a subscriber through a conventional or special telephone system. The system may be energized by pulses or by "Dual Tone Multiple Frequency" coding and may be used in either commercial or military systems.

Activation of the complete system may be accomplished by various transducers which convert physical phenomena into electrical quantities. Some of the conditions capable of actuating the system of the present invention are those associated with temperature, fire or flame, sound, presence of specific gas, moisture, radio frequency signals, atomic radiation and other conditions which can be sensed by transducers.

Once the system of the present invention has been activated, it causes automatic dialing of a remote station. The subscriber may be the police or fire department or security personnel. Also, hospital attendants may be the subscribers if the system is used to monitor heart rate, blood pressure temperature etc. of an intensive care patient, for example. Store owners and watchmen may also be serviced. If the system is used in a cold storage plant or automatic industrial process, maintenance men could be called in response to an abnormal condition activating the system.

When the called party picks up the receiver, a transcribed message or data is transmitted requesting that corrective measures be taken to remedy the abnormal condition. The subject invention may be used in a data transmission and corrective link where information is stored or corrective measures are transmitted back along common lines to automatically compensate for any abnormality, as may be the case where the condition detected involves a highly dangerous situation requiring immediate action.

Also, a carrier of important documents or valuables may also utilize the system of the present invention by being able to transmit actuation signals to a base station to notify proper authorities of any abnormal situations which might arise, such as a robbery attempt.

The tape recorder may take a number of different forms. It may involve an endless tape or may involve automatic rewinding during automatic transmission. It may include the dialing of numbers of more than one station for sequentially calling other stations if the first station fails to answer. Different messages could be transmitted to different stations.

While a particular system has been described, it is apparent that the circuitry for performing many of the functions described may take a wide variety of different forms. For example, while mechanical relays have been illustrated, different types of solid state circuitry or other arrangements may be employed for switching.

It is also evident that the system may be manually operated to cause automatic dialing and message transmission. For example, aged or semi-invalid persons may manually actuate the system by simply closing a switch or moving some other device conveniently located. In these cases, the transducers would not be used to respond to abnormal conditions.

What is claimed is:

1. A system for responding to a condition at a site for selectively dialing the address of a remote station and transmitting through transmission lines a message relating to said condition comprising storage means for storing pulse signals representing the address of said remote station and said message signals, a normally open circuit connected between said storage means and said transmission lines, means responsive to said condition to close said normally open circuit path and to sequentially apply said pulse signals and said message signals from said storage means through said transmission lines, a timing circuit including an integrator circuit responsive to said pulse signals, a bistable circuit for maintaining a closed path between said storage means and said transmission lines, means for applying said pulse signals to actuate said bistable circuit to close the path between said storage means and said transmission lines during a dialing operation, means for applying said pulse signals to said timing circuit to actuate said timing circuit after the transmission of said pulse signals to produce an output signal, means for applying said output signal to said bistable circuit after the transmission of said pulse signals to maintain said open circuit closed to permit the transmission of said message signals through said transmission lines after the transmission of said pulse signals.

2. The invention as set forth in claim 1, wherein a different circuit path is provided to connect said pulse signals from said storage means to said transmission lines with said timing circuit being responsive to open said different circuit path upon the completion of the transmission of said pulse signals.

3. The invention as set forth in claim 1 wherein the means responsive to said condition includes a transducer for generating an electrical signal.

4. The invention as set forth in claim 3 wherein a receiver is provided, said receiver being responsive to electrical signals generated by said transducer.

5. The invention as set forth in claim 3 wherein a transmitter is provided to transmit signals to said receiver in response to electrical signals produced by said transducer.

6. The invention as set forth in claim 5 wherein the electrical signals produced by said transducer cause modulation of a carrier frequency of said transmitter, with said modulation involving at least two modulation frequencies.

7. The invention as set forth in claim 6 wherein a recycling circuit is provided to reset the system to its original state after the transmission of signals relating to the address of said remote station and said message.

8. The invention as set forth in claim 7 wherein said timing circuit includes a bi-stable circuit responsive to a voltage exceeding a predetermined level developed across a charging circuit.

9. The invention as set forth in claim 8 wherein a second bi-stable circuit is included in said means responsive to said condition to close said circuit path.

* * * * *